May 23, 1933.  M. J. JOHNSON  1,910,340
MEANS FOR INDICATING AND/OR RECORDING UNKNOWN QUANTITIES
Filed Feb. 21, 1931
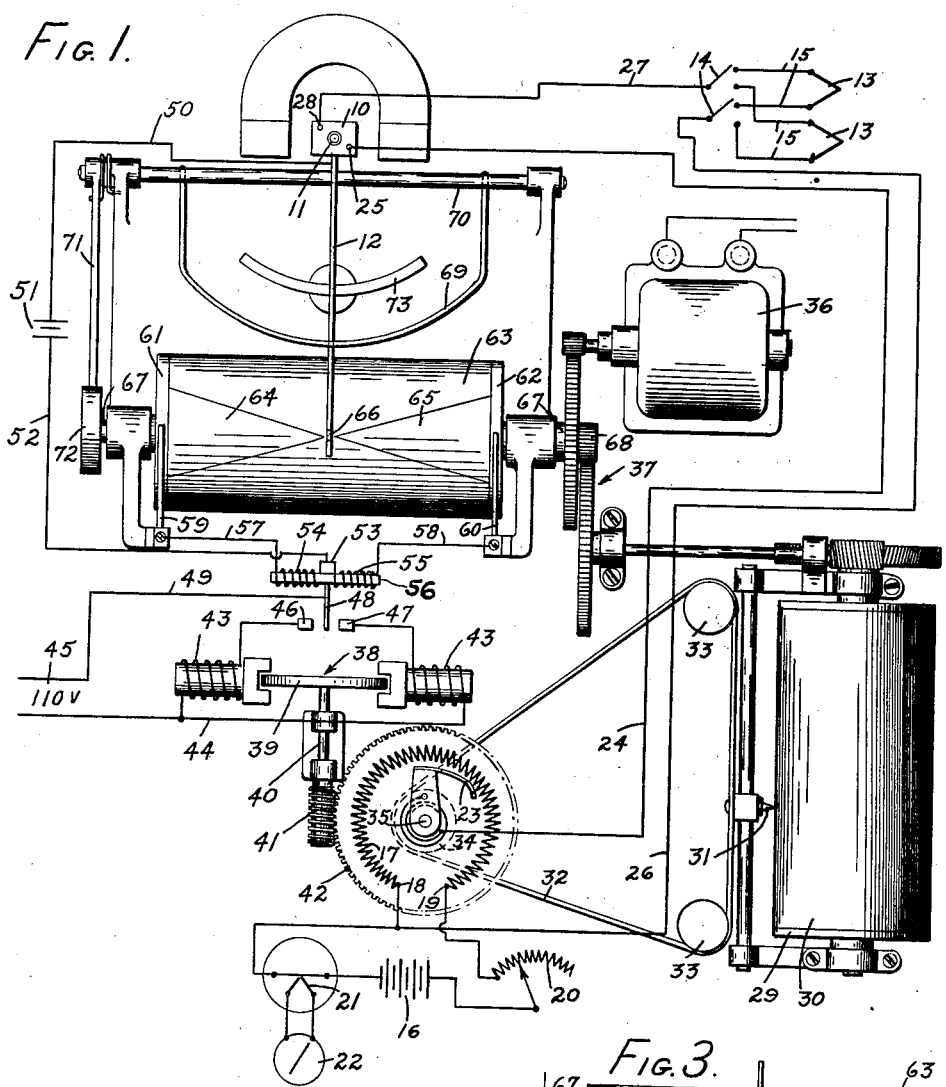
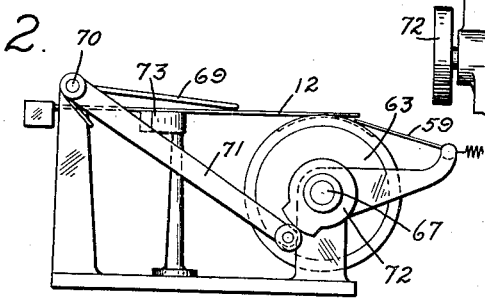
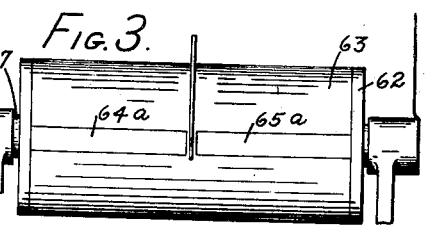
INVENTOR.
Manfred J. Johnson
BY
ATTORNEY Patented May 23, 1933

1,910,340

UNITED STATES PATENT OFFICE

MANFRED J. JOHNSON, OF NAUGATUCK, CONNECTICUT, ASSIGNOR OF ONE-HALF TO THE LEWIS ENGINEERING COMPANY, OF NAUGATUCK, CONNECTICUT

MEANS FOR INDICATING AND/OR RECORDING UNKNOWN QUANTITIES

Application filed February 21, 1931. Serial No. 517,435.

This invention relates to means for indicating and/or recording unknown quantities, and in its more specific aspects, to a recording potentiometer.

Such instruments have heretofore been provided and are used in the industries for indicating and recording temperatures, water levels, steam pressures, etc., and not infrequently a single recording potentiometer is used to indicate and record known quantities from several different furnaces, tanks, or the like, the arrangement being such that the potentiometer is connected periodically to one after the other of the various apparatus, the unknown quantity of which is to be measured and recorded from time to time, and the intermediary of the connection of the potentiometer to each individual apparatus depending upon the length of time which the potentiometer requires to perform its functions as well as the number of various apparatus with which it is to be connected.

An object of the present invention is to provide such an indicating and/or recording instrument in which the time required for the potentiometer to function to a point where it gradually indicates the unknown quantity is substantially reduced, thereby permitting the period during which the unknown quantity is indicated or recorded to be increased in duration or alternatively permitting the number of various apparatus associated with the potentiometer to be increased, so that if it is otherwise expedient a single recording potentiometer of the present invention may serve a greater number of various apparatus than was heretofore possible.

This is accomplished in the form of the present invention herein illustrated by providing means electrically controlled by the off-zero movements of the balancing device of the potentiometer for automatically varying the effect of a counter quantity applied to the balancing device, the speed of operation of the electrically controlled means being susceptible of being made practically as great as desired, so that the counter quantity may be varied substantially instantaneously upon the operation of such means.

Preferably the means provided by the present invention is quantitatively as well as electrically controlled by the off-zero movements of the balance so that the speed of duration of operation of the counter quantity varying means may be greater the farther the off-zero movements of the balance, and in this way it is possible to quickly vary the counter quantity without danger of the balancing means over-shooting the zero position.

The means for automatically varying the effect of the counter quantity, according to the present invention, preferably includes an electric motor, and since the deflections of the balance are plus and minus from the zero position, the motor is preferably of the reversible type, although, of course, it may be a uni-directional motor with reversible drive if desired. Accordingly, the counter effect varying means also preferably includes means for controlling the direction as well as the extent of operation of the motor or the drive therefrom.

In recording and indicating potentiometers heretofore provided, the means for varying the counter quantity was operated mechanically—that is to say, by intermittent ratchet-like mechanical motion under the control of the deflections of the balancing means, but such intermittent or ratchet means having an angularly limited amplitude of operation and a physical limit upon the frequencies of oscillations could not vary the counter quantity applied to the balance with any great rapidity, and hence when a single potentiometer was used with a large number of various apparatus the time intervals between the indications or recordations was extremely prolonged and thus constant and accurate control or study of the various apparatus was impossible.

Other features and advantages will hereinafter appear.

In the accompanying drawing—

Figure 1 is a diagrammatic view of the recording potentiometer of the present invention, the means for automatically varying the effect of the counter quantity shown in this figure being that at present preferred.

Fig. 2 is a side view of the galvanometer control switch device shown in Fig. 1.

Fig. 3 is a top view of a modified form of galvanometer switch device.

In the form of the invention shown in the accompanying drawing, the balancing device comprises a galvanometer 10 having an armature 11 and a needle 12 having a normal zero position shown in Fig. 1, from which it may be moved to the right or left when the galvanometer is acted upon by the source of E. M. F. The galvanometer 10 is in a circuit adapted to be connected to one or more thermocouples 13, as, for instance, by a switch 14.

The thermocouples 13 are connected by wires 15 leading to certain apparatus, an unknown quantity in connection with which is to be indicated and recorded, each thermocouple being placed in an apparatus in accordance with the usual or any known manner.

When a thermocouple, or other condition-responsive device, as a resistance thermometer or a manometer, is connected as by the switch 14 to the galvanometer 10, the current from the condition-responsive device or controlled thereby causes the needle 12 of the galvanometer to deflect in one direction or the other. To indicate the unknown quantity which thus causes the needle to deflect, the recording instruments, such as recording potentiometers, are provided with means for applying a counter and known quantity to the galvanometer to balance the quantity applied thereto by the condition-responsive device, and since the amount of the counter effect is known in advance, the unknown quantity may be indicated or recorded by the amount of known quantity which it was necessary to apply to the galvanometer in order to return the needle to zero position.

As heretofore provided and as herein shown, this counter quantity is derived from a source of E. M. F. 16, being usually in the form of a storage battery, and the effect of the source of E. M. F. 16 on the galvanometer 10 is controlled by a potentiometer slide wire 17, the potential drop across the terminals 18 and 19 of the slide wire 17 being regulated by an auxiliary resistance 20 in comparison with a standard cell or a thermocouple 21, such as described and claimed in my Patent No. 1,726,182, granted August 27, 1929, by means of a galvanometer 22. The slide wire 17 is engaged intermediate its ends by a shiftable contact 23 connected by a wire 24 to one terminal 25 of the galvanometer while the terminal 18 of the slide wire 17 is connected by a wire 26 to the switch 14 by means of which the system may be connected to one or more of the condition-responsive devices 13, the other side of the switch 14 being connected by a wire 27 to the other terminal 28 of the galvanometer. Thus, when a condition-responsive device 13 is thrown in the circuit by the switch 14, the needle 12 of the galvanometer may deflect either to the right or to the left and it may be returned to its zero position by shifting the contact point 23 relative to the slide wire 17 until a counter quantity is applied to the galvanometer by the source of E. M. F. 16. The resistance of the slide wire 17 being known and the positions of the contact 23 having been calibrated, the condition of the apparatus containing the thermocouple 13 which is in circuit will also be known.

Heretofore it was proposed to mechanically adjust the variable contact 23 under the control of the deflections of the galvanometer needle 12, but, as pointed out above, this operation was slow in comparison with the speed with which the contact 23 may be adjusted, according to the present invention.

Before proceeding to describe the specific embodiments of the invention herein shown, it should be noted that the various positions of the shiftable contact 23 of the slide wire may be indicated graphically on a cylinder 29 or like device containing a record sheet 30 over which a marking device 31 may travel. As diagrammatically indicated in Fig. 1, this marking device is carried by a belt 32 extending over pulleys 33 so that the marking device 31 will travel parallel with the cylinder and over a pulley 34 connected to a shaft 35 carrying the variable contact 23. The cylinder 29 may be rotated by suitable clockwork mechanism so that the conditions referred to will be recorded graphically over a period of time, portions of which are indicated by previously prepared lines on the record sheet 29. According to the present invention, for reasons which will appear below, it is preferable to rotate the cylinder 30 by a synchronous motor 36 through a suitable train of gearing 37.

In the specific form of the invention shown in Fig. 1, the movable element of the slide wire device, i. e. the contact 23 in the form shown, is effected by an electric motor 38 which has an armature 39 on a shaft 40 having a worm 41 engaging a worm wheel 42 on the shaft 35 carrying the contact 23. This motor, for reasons above referred to, is of the reversible type and has fields 43 connected by a wire 44 to a source of E. M. F. 45 and individual contacts 46 and 47 adapted to be connected by a switch device 48 to a wire 49 leading to the other side of the source of current 45. Thus, by moving the switch arm 48 into engagement with either of the contacts 46 or 47, the motor will operate in either one direction or the other, causing the contact 23 to move toward the terminal 18 or toward the terminal 19 of the slide wire 17.

Instead of having a reversible motor, a unidirectional motor may be employed with a reversible driving train, but, due to the simplicity attained by the use of a reversible motor, the latter is much to be preferred.

According to the present invention, the circuits through the motor 38 and contact 46 and 47 are selectively closed under the control of the deflections of the galvanometer needle in either one direction or the other. This may be accomplished in several different ways, but, as shown in the accompanying drawing, it is so accomplished that the galvanometer needle need carry nothing more than battery currents and need not actually move any parts.

Accordingly, the galvanometer needle 12 is connected by a wire 50 to a battery or other suitable source of E. M. F. 51 of low potential which at its other side is connected by a wire 52 with a common wire 53 of two solenoids 54 and 55, the common armature 56 of which carries the switch blade 48 which is adapted to engage the contacts 46 and 47 of the motor circuits. The solenoids 54 and 55 have their other ends connected by wires 57 and 58 respectively, to brushes 59 and 60 engaging collector rings 61 and 62 at opposite ends of a drum or cylinder 63 located under the end of the needle 12. This drum 63 has on its periphery contacts 64 and 65 connected to the collector rings 61 and 62 respectively, and these contacts are adapted to be engaged by a contact 66 on the needle 12 of the galvanometer. The drum 63 may be made of insulating material but if not the contacts 64 and 65 with the collector rings 61 and 62 are insulated from each other in any suitable manner.

The contacts 64 and 65 are separated from each other at a point directly beneath the zero position of the contact 66 of the galvanometer needle 12 so that when the needle 12 is in zero position no current flows through the solenoids 54 or 55. However, when the needle deflects to the right as viewed in Fig. 1, and the point 66 thereon engages the contact 65 the circuit through the solenoid 55 is closed causing the armature 56 to move to the right and moving the switch blade 48 into engagement with the contact 47 of the motor circuit so as to cause the motor to rotate in one direction. When the needle deflects to the left from the zero position, the point 66 engages the contact 64 and closes the circuit through the solenoid 54 so as to cause the motor to operate in the other direction.

In the form shown the drum 63 is carried by a shaft 67 having at one end a gear 68 which may form part of the gear train 37 which connects the motor 36 with the recording cylinder 29, and hence the drum 63 is driven by the motor 36 in synchronism with the recording drum 29.

Were the contact point 66 in continual engagement with the drum 63, the load on the needle 12 would be so great that the galvanometer 10 could not operate with sufficient sensitivity. Accordingly, the needle 12 is normally biased so as to be lifted from the surface of the drum 63 and means are provided for intermittently forcing it into engagement with the drum. Such means temporarily arrest the operation of the galvanometer. For this purpose, any suitable means may be provided, but, as shown, there is a bail 69 overlying the needle 12 and pivoted on a shaft 70 having an arm 71 engaging a cam 72 on the shaft 67 of the drum, the cam being so positioned and being of such length that the contact point 66 of the needle is brought into engagement with the drum at the time that the contacts 64 and 65 come into range of the needle and so that the needle is allowed to flex upwardly out of engagement with the drum 63 as soon as the contacts 64 and 65 pass out of range of the needle. In order to prevent the flexing of the needle from damaging the balance of the armature 11, a segmental anvil 73 is provided under the needle between the armature and the drum and this anvil limits the flexing movements of the needle under the influence of the bail 69 which is also made segmental.

The contacts 64 and 65 which directionally control the operation of the motor 38 to vary the counter quantity applied to the galvanometer may, as shown in Fig. 3, be straight segments 64a and 65a under which circumstance the motor 38 will operate for a predetermined length of time and in one direction or the other depending upon which contact the needle engages each time the cylinder 63 revolves while the needle 12 is in off-zero position. Even though under some circumstances this may be a desirable arrangement and hence is well within the scope of this invention, it is preferable to have the contacts 64 and 65 quantitatively control the operation of the motor 38 as well as directionally so that if the needle should be deflected far from zero position which would be indicative of an unbalance of great magnitude, the motor will operate for a greater length of time and thus more quickly attain a balance, while when the needle is only slightly deflected the motor operates for a relatively short time.

This is accomplished by making the contacts 64 and 65 triangular in shape with their apexes adjacent but slightly spaced from each other at the zero position of the point 66 on the galvanometer needle 12. That is to say, the contacts 64 and 65 gradually increase in width from adjacent the zero position of the contact point 66 outwardly toward the collector rings 61 and 62 respectively, so that the needle 12 is in engagement with the contact for a greater or lesser length of time according to its deflection from zero position. With this arrangement there is practically no danger of the contact 23 of the slide wire device being moved too far at one operation and requiring another operation to move back again.

With this arrangement it is possible to so proportion the size of the contacts 64 and 65 and their convergencies as well as controlling the speed of the motor 38 that the number of revolutions of the motor will for practical purposes be just so many as is necessary to shift the contact point 23 to a balancing position for each off-zero movement of the needle 12, regardless of this magnitude, and hence it is possible to arrange the instrument so that a truly balanced condition is obtained at each revolution of the drum 63.

Accordingly it will be seen that the advantage accruing from the instrument of this invention in which the recording stylus and balancing means are electrically instead of mechanically adjusted as heretofore, lies in its speed of operation and universal control. This is important even where the recording potentiometer is to be used with only one thermocouple, but where it is to be used with a plurality of thermocouples, it is of extreme importance, for in such cases first one thermocouple and then another is connected to the same recording potentiometer, preferably in as rapid a succession as the instrument will permit and yet give a true reading.

For instance, in the case of thermocouples registering the temperature of the carburetor and superheater in gas-making machines, the superheater of which is always of a higher temperature than the carburetor and quite varied therefrom, each switching of the recording potentiometer to one of the thermocouples from the other causes the galvanometer needle to widely deflect, first in one direction and then in the other, requiring considerable movement of the balancing means to balance the circuit and truly indicate the temperature. This see-sawing goes on continuously and if, as in the present case, the potentiometer quickly shifts to a balanced position and records that position, it may therefore be shifted to the other thermocouple sooner than would be possible with a slower moving mechanically actuated balancing means and recording stylus and would therefore give a truer reading of both the temperature of the carburetor and the temperature of the superheater.

Variations and modifications may be made within the scope of this invention and portions of the improvements may be used without others.

Having thus described the invention, what is claimed as new and for which it is desired to obtain Letters-Patent, is:—

1. An indicating instrument comprising a deflector operating on the zero principle; means for causing an unknown quantity to act on the deflector; means for applying a counter quantity to the deflector; means including a contact moved by the deflector in its off-zero movement, and a cooperating contact having an effective width increasing in the direction of the first-named contact's off-zero movement, said contacts being relatively movable while in engagement, in the direction of the width of the second-named contact, said means quantitatively and electrically varying the effect of the counter quantity; and means controlled by the varying means for indicating the unknown quantity.

2. An indicating instrument comprising a deflector operating on the zero principle; means for causing an unknown quantity to act in the deflector; means for applying a counter quantity to the deflector; means including an electric motor, a contact moved by the deflector in its off-zero movement, a cooperating contact having an effective width increasing in the direction of the first-named contact's off-zero movement, said contacts being relatively movable while in engagement, in the direction of the width of the second-named contact to control the extent of operation of the motor, said means quantitatively and automatically varying the effect of the counter quantity; and means controlled by the varying means for indicating the unknown quantity.

3. An indicating instrument comprising a deflector operating on the zero principle; means for causing an unknown quantity to act on the deflector; means for applying a counter quantity to the deflector; means for varying the effect of the counter quantity including a reversible electric motor, a contact moved by the deflector in its off-zero movements in either direction and a pair of cooperating contacts each having an effective width increasing from the zero position of the first-named contact in the direction of the latter's off-zero movements, said first-named contact and the pair of cooperating contacts being relatively movable while in engagement, in the direction of the widths of the second-named contacts and the latter being adapted to control the extents of movements of the motor in opposite directions respectively to quantitatively and directionally control the movements of the motor; and means controlled by the varying means for indicating the unknown quantity.

4. Means for adjusting the slide wire in a potentiometer system having a galvanometer, comprising an electric motor; a variable connection to the slide wire operated by the motor; a motor control circuit; a contact in the motor control circuit movable at constant speed; and a contact controlled by the galvanometer adapted to engage the first-named contact intermittently to cause the motor to operate.

5. Means for adjusting the slide wire in a potentiometer system having a galvanometer, comprising a reversible electric motor; a variable connection to the slide wire operated by the motor; a motor control circuit; a pair of contacts in the motor control circuit movable at constant speed, one for the controlling operation of the motor in each direction; and a contact controlled by the galvanometer adapted to engage either one of the first-named contacts intermittently in its off-zero movements to cause the motor to operate in one direction or the other depending upon the direction of the off-zero movements of the galvanometer and the particular one of said pair of contacts which it engages.

6. Means for adjusting the slide wire in a potentiometer system having a galvanometer, comprising an electric motor; a variable connection to the slide wire operated by the motor; a motor control circuit including a contact controlled by the galvanometer; a cooperating contact normally incapable of engaging the contact moved by the galvanometer; and means operated independently of the galvanometer for causing said contacts to be pressed into firm engagement intermittently.

7. Means for adjusting the slide wire in a potentiometer system having a galvanometer, comprising an electric motor; a variable connection to the slide wire operated by the motor; a motor control circuit; a drum having a contact in the motor control circuit movable at constant speed; a cooperating contact in the motor control circuit moved by the galvanometer in its off-zero movements and normally out of engagement with the drum or the contacts thereon; and means for periodically causing said galvanometer contact to move into engagement with the drum or the contact carried thereby.

8. Means for adjusting the slide wire in a potentiometer system having a galvanometer, comprising a reversible motor having one armature and two separate field structure circuits, one for causing the rotation of the motor in each direction; and intermittently operating means controlled by the galvanometer and including a constant speed device for closing either circuit leading to said field structures respectively depending upon the direction of off-zero movements of the galvanometer.

9. Means for adjusting the slide wire in a potentiometer system having a galvanometer, comprising an electric motor; a variable connection to the slide wire operated by the motor; and means periodically made operative and upon each periodic operation causing the motor to operate a greater or lesser extent controlled by the galvanometer in its off-zero movements and depending upon the magnitude of said off-zero movements.

10. Means for adjusting the slide wire in a potentiometer system having a galvanometer, comprising an electric motor; a variable connection to the slide wire operated by the motor; and means periodically made operative and at each operation causing the motor to operate a greater or lesser extent in one direction or the other and controlled by the galvanometer in its off-zero movements and depending upon the magnitude and direction of said off-zero movements.

11. In combination, a deflector operating on the zero principle; means for causing an unknown quantity to act on the deflector; means for applying a counter quantity to the deflector; an electric motor; and periodically operated means electrically controlling said motor as to duration of its operation by the extent of off-zero movement of the deflector predeterminedly at each periodic operation of said last-named means for automatically and quantitatively varying the effect of the counter quantity.

12. In combination, a deflector operating on the zero principle; means for causing an unknown quantity to act on the deflector; means for applying a counter quantity to the deflector; and periodically operated means electrically predetermined and controlled at each periodic operation by the off-zero movement of the deflector and quantitatively in accordance with the extent of said off-zero movement for automatically and quantitatively varying the effect of the counter quantity.

13. In combination, a deflector operating on the zero principle; means for causing an unknown quantity to act on the deflector; means for applying a counter quantity to the deflector; and electrically operated time controlled means periodically made operative and electrically and predeterminedly controlled by the extent and direction of off-zero movement of the deflector for varying the effect of the counter quantity to establish equilibrium between the unknown and counter quantities at each periodic operation.

14. In combination, a deflector operating on the zero principle; means for causing an unknown quantity to act on the deflector; means for applying a counter quantity to the deflector; an electric motor for shifting said counter quantity applying means; and a control circuit for said motor including means for causing the duration of time during which the motor continuously operates to be in accordance with the extent of off-zero movement of the deflector, said last-named means acting to prevent shifting of the deflector during the operation of said means.

15. Means for adjusting the slide wire in a potentiometer system having a galvanometer, comprising an electric motor; a variable connection to the slide wire operated by the motor; a motor control circuit; a contact in the motor control circuit movable at constant speed; a contact controlled by the galvanometer adapted to engage the first-named contact intermittently to cause the motor to operate; and means for holding the galvanometer contact against movement while in engagement with the other contacts.

Signed at Bridgeport, in the county of Fairfield, and State of Connecticut, this 17th day of February, 1931.

MANFRED J. JOHNSON.